United States Patent [19]
Lassau et al.

[11] 3,773,657
[45] Nov. 20, 1973

[54] CATALYTIC PROCESS FOR CONVERTING HYDROCARBONS

[75] Inventors: Christian Lassau; Claude Roux-Guerraz, both of Paris; Lucien Sajus, Croissy sur Seine, all of France

[73] Assignee: Institut Francois du Petrole, des Carburants et Lubrifiants, Rueil Malmaison, France

[22] Filed: Oct. 27, 1970

[21] Appl. No.: 84,496

[30] Foreign Application Priority Data
Nov. 5, 1969  France .................. 6938132

[52] U.S. Cl. ............... 208/124, 208/114, 208/122, 208/123, 260/668 D
[51] Int. Cl. ............................................. C10g 11/02
[58] Field of Search ............... 208/114, 122, 123, 208/124; 260/668 D

[56] References Cited
UNITED STATES PATENTS

| | | | |
|---|---|---|---|
| 2,369,734 | 2/1945 | Heard ........................... | 208/123 X |
| 2,499,255 | 2/1950 | Parker ........................... | 208/123 X |
| 2,914,464 | 11/1959 | Burton et al. ................... | 208/124 X |
| 2,989,372 | 6/1961 | Gilbert .......................... | 208/122 X |
| 3,125,508 | 3/1964 | Adlington et al. ............... | 208/114 X |
| 3,567,796 | 3/1971 | Estes et al. ..................... | 208/124 X |
| 3,617,518 | 11/1971 | Sinfelt et al. .................. | 260/668 D X |

*Primary Examiner*—Daniel E. Wyman
*Assistant Examiner*—P. F. Shaver
*Attorney*—Millen, Raptes and White

[57] ABSTRACT

For converting hydrocarbons, particularly by cracking and dehydrogenation, react hydrocarbons at 225°–800°C, particularly 300°–600°C, in contact with a soluble catalyst in liquid phase, said catalyst comprising a compound of a metal of group Ib, IIb, IVa, Va, VIa, VIIa or VIII and a reducing agent, particularly one of formula $Al\ H_n\ X_{3-n}$ with $n = 1$ or $2$, $X = $ OR, $NR_2$, NHR or SR, R being a monovalent organic radical, or one of formula $Me\ [Al\ H_m X'_{4-m}]p$ wherein $m$ is 1, 2 or 3, $p$ is the valence of Me, i.e., of a metal of group Ia or IIa, and X' is R, OR, $NR_2$, NHR or SR.

22 Claims, No Drawings

CATALYTIC PROCESS FOR CONVERTING HYDROCARBONS

This invention relates to a new process for converting hydrocarbons by contacting a hydrocarbon feed charge with a catalyst. This conversion process includes particularly such reactions as hydrocarbons cracking and dehydrogenating.

By cracking, there is meant obtaining molecules lighter than those of the feedstock. This operation mainly consists of breaking carbon-carbon bonds, and also includes in variable proportions, such reactions as dehydrogenation, hydrogen transfer and isomerization of the carbon skeleton of the molecules.

The dehydrogenation results in hydrocarbons of the same number of carbon atoms, however with a lower hydrogen content.

When carried out at high temperature, these reactions are well-known by those skilled in the art and are carried out, in practice, at temperatures from 450° to 1,400°C, according to the type of charge and the desired degree of conversion. Heterogeneous catalysts may be used, in particular simple oxides of acid character or metals on carriers.

This invention describes the use, in this type of reactions, of a new catalyst soluble in hydrocarbons, which may be entirely dissolved, partially or completely, in the charge before it enters the reactor.

The catalyst which may be used according to this invention results from contacting a metal compound with a reducing agent.

The metal compound may be any salt of a metal from groups I$b$, II$b$, IV$a$, V$a$, VI$a$, VII$a$ and VIII, such as titanium, vanadium, chromium, manganese, iron, cobalt, nickel, copper, zinc, zirconium, molybdenum, ruthenium, rhodium, palladium, tungsten, iridium or platinum. The associated ions may be either inorganic, such as the hydrides, halogenides or sulfocyanides ions, or organic such as for example an alkoxide ion, the acetylacetonate ion, the cyclopentadienyl ion, the sulfonate ion, for example the camphorsulfonate ion, or an ion from an organic acid, for example stearic acid, 2-ethyl hexanoic acid or a naphthenic acid. Optionally the metal may be coordinated with electron-donor ligands, such as ethers, amines, phosphines, arsines and stibines.

The following are examples of useful compounds: cobalt bromide, iron, cobalt or nickel naphthenate, oleate, stearate or octoate, irrespective of their content of metal, ferric chloride, chromium acetylacetonate, dichlorodicyclopentadienyl titanium, bis-tricyclohexyl phosphine dibromocobalt, and manganese chloride.

The reducing agent is preferably an organoaluminum derivative having at least one hydrogen-aluminum or carbon-aluminum bond. Preferred agents are those of the two following formulae:

1. those of the general formula Al H$_n$X$_{3-n}$ in which $n$ is 1 or 2 and the X groups, either identical or not, are OR, NR$_2$, NHR or SR groups wherein R is an optionally substituted, linear or cyclic monovalent organic radical which may contain heteroatoms, for example oxygen, sulfur, nitrogen atoms and even metals. R contains for example 1 to 20 carbon atoms and is for example alkyl, cycloalkyl or aryl. Alkyl of 2–20 carbon atoms is preferred.

When $n$ is 1, the two X groups may be linked to form an —A—Z—B— group in which A and B are alkylene radicals and Z is an oxygen or sulfur atom, an alkylene group, a NH group or a N-hydrocarbyl group;

2. those of the general formula ME[AL H$_m$X$'_{4-m}$]$p$ in which $m$ is 1, 2 or 3; Me is a mono- or a di-valent metal from group I A or II A and $p$ is the valence of this metal. The X′ groups, either identical or not, are R, OR, NR$_2$, NHR or SR groups in which R is as hereinbefore defined. Two X′ groups may be linked together as described hereinbefore with respect to X.

As reducing agents of the above formulae, the following may be named by way of examples:

LiAlH (O-tert-butyl)$_3$, NaAlH (O-tert.-butyl)$_3$ AlH (O-tert-butyl)$_2$, NaAlH (C$_2$H$_5$)$_3$, NaAlH$_2$(iso-butyl)$_2$, NAAlH (OCH$_2$CH$_2$OCH$_3$)$_3$, NaAlH$_2$

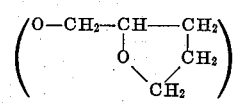

(O-tert-butyl) LiAlH$_2$(iso-butyl)$_2$,

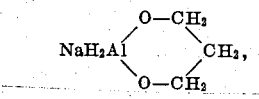

LiAlH(C$_2$H$_5$)$_3$, and NaAlH (OC$_2$H$_5$)$_3$.

Other useful although less preferred and less active reducing agents are those of the formula:

AlR$_2$OR or AlR′$_3$ wherein the R groups, either identical or not, are defined as before and contain each at least 2 carbon atoms. The R′ groups are hydrogen or halogen atoms or hydrocarbyl groups containing each from 2 to 20 carbon atoms, at least one of which being a hydrocarbyl radical.

As examples the following are mentioned: ethoxydiethyl aluminum, triethylaluminum, tert.butoxy diethyl aluminum, ethyl aluminum sesquichloride, and di-n.butyl aluminum hydride.

The reducing agent may be contacted with the metal compound, when manufacturing the catalyst, either inside or outside, the reaction medium. In the latter case, the reduction may be carried out at a lower temperature, and it is possible to use reducing agents which can hardly be used in situ, for example some metals or metal compounds which can result in soluble catalysts, although they are not soluble alone; some organometallic reducing agents are too unstable to be used easily in situ.

The catalyst may be used in a solvent, although operating without a solvent is preferred.

According to the metal compound and the associated reducing agent, the molar ratio of the reducing agent to the metal compound may be varied. It is usually selected from 0.5 to 20, and preferably from 1 to 6.

Oxygen acts as an inhibitor to the reduction of the metal compound. However, the latter may be carried out in a nitrogen, argon or methane atmosphere and preferably in a hydrogen atmosphere. Although solvents may be used, the preferred agents are the hydrocarbon reactants, such as paraffins or cycloparaffins. When a certain amount of olefin is present during the catalyst manufacture, the resulting catalyst is highly active.

The reaction is conducted at 225°–800°C, and preferably at 300°–600°C. However the catalyst is preferably manufactured at a lower temperature.

The feed is preferably a hydrocarbon, either aliphatic and containing 2–40 carbon atoms or cyclic and containing 5–20 carbon atoms. Alkylaromatic hydrocarbons of 8–25 carbon atoms may also be treated, the alkyl groups(s) having 2–20 carbon atoms.

A hydrocarbon mixture may also be used, for example a petroleum cut. Aromatic hydrocarbons may be present without any inconvenience.

The concentration of metal may be as low as 0.0001 g per 100 g of feed to be treated. The preferred concentrations are between 0.001 and 1 g of metal per kg of feedstock.

The reaction is carried out in liquid phase, optionally in the presence of a vapor phase. Oxygen is detrimental to the catalyst; however the reaction may be carried out in the presence of such gases as hydrogen, nitrogen, argon or a light hydrocarbon such as methane, ethane or propane. Hydrogen is beneficial when relatively saturated products or a long life of the catalyst are desired.

The following examples are given for illustrative purposes:

EXAMPLE 1

0.005 part by weight of a catalyst consisting of cobalt stearate and Na Al $H_2$ (O-tert-butyl) (O-tetrahydrofurfuryl) whose molar ratio Al/Co is 2, is introduced into 100 parts by weight of cetane preheated to 420°C. After about 90 minutes the initial pressure of 2 bars is increased to 15 bars. 19 percent of cetane have been cracked and the resulting liquid product consisted, in addition to unconverted cetane, of 32 percent $C_4$–$C_8$, 34 percent $C_9$–$C_{12}$, and 34 percent $C_{13}$–$C_{15}$ hydrocarbons.

EXAMPLE 1 bis

Example 1 has been repeated, however without aluminum compound. The conversion was only 6 percent.

EXAMPLE 1 ter

Example 1 has been repeated, however without catalyst. A purely thermal reaction has taken place but the conversion rate of cetane was only 6 percent.

EXAMPLE 2

Example 1 has been repeated at 430°C, thus resulting in a 40 percent conversion rate of cetane. The liquid products had substantially the same composition as in example 1.

EXAMPLE 3

A light gas-oil of the following composition :
distillation T B P 20 percent at 255°C
  50 percent at 280°C
  80 percent at 310°C
has been treated as in example 1. The conversion rate was 40 percent to gasoline and gas. The products had but a low content of free carbon.

EXAMPLES 4 to 9

Example 3 has been repeated with other catalysts. The results are summarized in the following table:

| Example | Metal compound | Al compound | Molar ratio Al compound/metal compound | Conversion to gas and gasoline, percent |
|---|---|---|---|---|
| 4 | Nickel stearate | Na AlH(O $C_2H_5$)$_3$ | 1.5 | 35 |
| 5 | Chromium stearate | Li AlH(O-tert-butyl)$_3$ | 4 | 30 |
| 6 | Ti (cyclopenadiene)$_2$Cl$_2$ | Na AlH$_2$(iso-$C_4H_9$)$_2$ | 6 | 29 |
| 7 | Cobalt octoate | Al H(O-tert-butyl)$_2$ | 1.5 | 32 |
| 8 | Ferrous stearate | Al ($C_2H_5$)$_2$O$C_2H_5$ | 4 | 11 |
| 9 | Cobalt stearate | Al (iso-butyl)$_3$ | 8 | 18 |

EXAMPLE 10

The catalyst has been manufactured by reacting 0.6 millimol. of Na Al $H_2$(O-tert-butyl) (O-furfuryl) with 0.2 millimol. of cobalt naphthenate. This solution has been injected into 100 ccm of previously purified tetrahydronaphthalene whose chromatographic analysis in gas phase shows no impurity. The whole has been heated up to 400°C under 2 atmospheres of hydrogen initial pressure. After 2 hours of reaction, the product has been cooled down and analysed by gas phase chromatography.

This analysis showed the presence of 20 percent of naphthalene which has also been characterized by its solid derivative with picric acid. The yield with respect to converted tetrahydronaphthalene was practically quantitative.

EXAMPLE 10 bis

Example 10 has been repeated, however without catalyst, under identical experimental conditions. The resulting product is unconverted tetrahydronaphthalene without naphthalene.

EXAMPLE 10 ter

Example 10 has been repeated with cobalt naphthenate however without aluminum compound, under otherwise identical conditions. Tetrahydronaphthalene has not been converted.

EXAMPLE 11

Example 10 has been repeated, however cobalt naphthenate has been substituted with nickel stearate, under otherwise identical conditions. 13 percent of naphthalene were present in the reaction products, as shown by chromatographic analysis.

The invention is not limited to the particular conditions and reactions shown before.

The preferred charges to be subjected to cracking are those chiefly consisting of hydrocarbons with an open chain, for example alkanes, alkenes and alkylaromatic hydrocarbons, such as, for example, heptane, hexadecane, eicosane, hexadecene and dodecylbenzene. In contrast, the dehydrogenation reaction prevails over the cracking reaction with the cycloalkanes and the at least partially saturated aromatic rings, for example cyclohexane and tetrahydronaphthalene.

We claim:

1. A catalytic process for dehydrogenating a hydrocarbon, said hydrocarbon being non-aromatic and at least partially saturated with hydrogen, said process comprising dissolving catalyst and in said hydrocarbon in the liquid phase; and heating resultant mixture to 225°–800° C. to dehydrogenate said hydrocarbon, said catalyst being a mixture of a compound of a metal selected from the groups IVa, VIa, VIIa and VIII of the periodic classification and a reducing agent selected from the group consisting of:

a. a compound of the formula $AlH_nX_{3-n}$ wherein $n$ is 1 or 2, X when taken individually is OR, $NR_2$, NHR or SR, R being a monovalent unsubstituted hydrocarbon radical or a hydrocarbon radical substituted by an ether group consisting of carbon, hydrogen and oxygen, and two X groups, when taken together, form an —A—Z—B group in which A and B are alkylene radicals and Z is an oxygen or sulfur atom, an alkylene group, a NH group or a N-hydrocarbyl group, b. a compound of the formula $ME[Al\ H_mX^1{}_{4-m}]p$ wherein $m$ is 1, 2 or 3, $p$ is the valence of Me, Me is selected from the monovalent and divalent metals of groups Ia and IIa, and the X' groups are selected from the R, OR, $NR_2$, NHR and SR groups when taken individually, and from —A—X—B— groups when taken by pairs, R being a monovalent unsubstituted hydrocarbon radical or a hydrocarbon radical substituted by an ether group consisting of carbon, hydrogen and oxygen; A and B being alkylene radicals and Z being an oxygen or sulfur atom, an alkylene group, a NH group or a N-hydrocarbyl group, c. a compound of the formula $AlR_2OR$ wherein R contains at least two carbon atoms and is a monovalent unsubstituted hydrocarbon radical or a hydrocarbon radical substituted by an ether group consisting of carbon, hydrogen and oxygen, and d. a compound of the formula $AlR'_3$ wherein R' is halogen or hydrocarbyl of 2–20 carbon atoms, with the provision that at least one R' is said hydrocarbyl radical, the molar ratio of the reducing agent to the metal compound being in the range of from 0.5 to 20.

2. A process as defined in claim 1 wherein said reducing agent is (a).

3. A process as defined in claim 1 wherein said reducing agent is (b).

4. A process as defined in claim 1 wherein said reducing agent is (c).

5. A process as defined in claim 1 wherein said reducing agent is (d).

6. A process according to claim 1 in which the reducing agent has the formula $AlH_nX_{3-n}$ in which $n$ is 1 or 2 and X is OR, R being alkyl of 2–20 carbon atoms.

7. A process according to claim 1 in which the reducing agent has the formula $Me[AlH_mX'_{4-m}]_p$ in which m is 1, 2 or 3 $p$ is the valence of the metal Me, Me is lithium or sodium and X' is OR in which R is alkyl of 1–20 carbon atoms.

8. A process according to claim 1, in which the reducing agent has the formula $AlR_2OR$ in which R is alkyl of 2–20 carbon atoms.

9. A process according to claim 1, in which the reducing agent has the formula $AlR'_3$ in which R' is alkyl of 2–20 carbon atoms.

10. A process according to claim 1, in which the catalyst is a mixture of cobalt stearate with the compound of formula $NaAlH_2$[O-tert.butyl] [O-tetrahydrofurfuryl].

11. A process according to claim 1, in which the catalyst is a mixture of nickel stearate and $NaAlH[OC_2H_5]_3$.

12. A process according to claim 1, in which the catalyst is a mixture of cobalt stearate and $Al[iso-butyl]_3$.

13. A process as defined by claim 1, wherein said hydrocarbon is cracked during the dehydrogenating reaction.

14. A process according to claim 1, wherein the molar ratio of the reducing agent to the metal compound is from 1 to 6.

15. A process according to claim 1, wherein the hydrocarbon is an alkane.

16. A process according to claim 1, wherein the hydrocarbon is a cycloalkane.

17. A process according to claim 1, wherein the hydrocarbon is a partially saturated condensed aromatic ring.

18. A process according to claim 1, wherein the metal compound is selected from the iron, cobalt and nickel compounds.

19. A process according to claim 1, wherein the metal compound is used at a rate of 1 to 1,000 parts by weight, expressed as metal, per million of parts by weight of hydrocarbon.

20. A process according to claim 1, wherein the reaction temperature is 300°–600°C.

21. A process as defined by claim 1 wherein R is alkyl, cycloalkyl or aryl and contains 1–20 carbon atoms.

22. A process as defined by claim 1 wherein R is alkyl of 2–20 carbon atoms.

* * * * *

UNITED STATES PATENT OFFICE
CERTIFICATE OF CORRECTION

Patent No. 3,773,657     Dated November 20, 1973

Inventor(s) Christian Lassau, et al.

It is certified that error appears in the above-identified patent and that said Letters Patent are hereby corrected as shown below:

IN THE CLAIMS:

CLAIM 1, COLUMN 5, FIRST LINE OF "b":

The formula "$Me[Al\ H_m X^1_{4-m}]p$" should read

-- $Me[AlH_m X'_{4-m}]p$ --.

CLAIM 7, COLUMN 6, THIRD LINE OF THE CLAIM:

After "3", insert a comma -- , --.

Signed and sealed this 16th day of April 1974.

(SEAL)
Attest:

EDWARD M.FLETCHER,JR.
Attesting Officer

C. MARSHALL DANN
Commissioner of Patents